United States Patent

[11] 3,568,738

[72] Inventor Elbridge W. Thrasher
     Ukiah, Calif.
[21] Appl. No. 791,930
[22] Filed Jan. 17, 1969
[45] Patented Mar. 9, 1971
[73] Assignee Masonite Corporation

[54] APPARATUS FOR SAWING WOOD TO PRODUCE SMOOTH ROTARY PLANED SURFACES
13 Claims, 6 Drawing Figs.

[52] U.S. Cl. ................................................. 143/55,
                            143/159, 143/160, 144/312
[51] Int. Cl. ................................................. B27b 11/02
[50] Field of Search ........................................... 143/160,
        160.8, 37, 157.6, 157.7, 159, 159.15, 159.16,
            159.17, 159.18, 159.5, 56, 37.1, 37.2, 55

[56] References Cited
         UNITED STATES PATENTS

| 15,304 | 1856 | Rice | 143/160 |
| 668,343 | 1901 | Roe | 143/37 |
| 775,477 | 1904 | Norlin | 143/160 |
| 219,139 | 1879 | Barnes | 143/55X |

FOREIGN PATENTS

| 45,894 | 1918 | Sweden | 143/160 |

Primary Examiner—Andrew R. Juhasz
Assistant Examiner—James F. Coan
Attorney—Eckhoff & Hoppe ABSTRACT: A method of sawing wood to produce a smooth rotary planed surface wherein a piece of wood is moved into a rotary saw in the direction of cutting while maintaining the sawed pieces in spaced relation and out of substantial contact with the back edge of the saw by shifting a splitter transversely in response to lateral transverse deflections of the saw.

A rotary saw machine having a pair of saw guides disposed on opposite sides of a saw blade mounted for axial movement upon a saw arbor, each saw guide comprising a wear member that is flexibly and resiliently supported for movement in a direction substantially parallel to the axis of blade rotation, each wear member having a surface that is maintained in contact with the side surface of the saw blade under a resilient preload force that urges the saw blade against the other wear member to rigidify the saw blade and maintain the blade in a predetermined cutting plane.

A rotary saw machine having a pair of saw guides disposed on opposite sides of the saw blade mounted for axial movement upon a saw arbor, means for yieldably supporting the saw guides for movement in a direction substantially parallel to the axis of blade rotation, and a splitter disposed adjacent the back edge of the saw blade and mounted to said support means, said splitter being free to move laterally in a direction substantially parallel to the axis of blade rotation in response to transverse deflections of the saw blade.

PATENTED MAR 9 1971 3,568,738

INVENTOR.
ELBRIDGE W. THRASHER
BY Eckhoff and Hoppe
ATTORNEYS

PATENTED MAR 9 1971

INVENTOR.
ELBRIDGE W. THRASHER
BY Eckhoff and Hoppe
ATTORNEYS

APPARATUS FOR SAWING WOOD TO PRODUCE SMOOTH ROTARY PLANED SURFACES

This invention relates to rotary saw equipment and to methods of operation for producing a smooth rotary planed surface. More particularly, the invention involves the construction and mounting of saw guides and splitter and methods by which they may be utilized, especially with relatively thin circular saws, to produce smooth surfaced lumber.

The use of saw guides for maintaining relatively thin saws in predetermined cutting planes is described in U.S. Pat. No. 3,285,302. It is also to be understood that the use of splitters in back of a saw is not novel. The present invention, however, is distinquishable from these prior art devices in several important respects. First, the construction and mounting of saw guides are herein described rigidifies the saw blade while effectively maintaining the blade in a predetermined cutting plane. A second improvement over the prior art devices is derived by mounting a splitter from a flexible guide support so that the splitter is free to move laterally in response to transverse deflections of the saw blade. It had been further discovered that an unusually smooth, rotary planed surface may be produced when the workpiece is moved against the saw blade in the direction of cutting while using a splitter in the manner described.

Conventional methods of rotary sawing normally contemplate that a piece of wood or workpiece will be moved against the saw blade in the direction opposite to the direction of cutting. This is especially true when the number of saw blades are use used in battery to slice or section a cant into several pieces of lumber. Under such conditions the saws themselves restrain the piece against a support surface and actually restrict its linear feed. It is evident, however, that by operating the saws in reverse (i.e., rotating the saws in the direction of feed) each saw tends to pull the workpiece forward and, if the saw is operated with a bottom arbor mounting, it will tend to lift the piece from the work surface. If this should happen, the piece may actually be fed over the top of the saws rather than being cut. Quite obviously such conditions of operation are undesirable both from production and safety standpoints Accordingly, it is the normal and well established practice to operate a rotary saw machine by passing the workpiece into the a saw against the direction of cutting rotation.

Nevertheless, various saw machines are used where the workpiece is moved into a battery of saws in the direction of cutting. For example, double arbor arrangements having a pair of aligned and coplanar saw blades are know wherein the workpiece is moved in the same direction of cutting with respect to one saw but against the direction of cutting with respect to the other. This is known as a "balanced cutting" arrangement, the pull of one saw being utilized to counteract the restraint imposed by the other.

It is further believed that single arbor saw machines have also been operated by moving the workpiece in the direction of cutting. However, those machines have used top arbor mountings so that the saw blades hold the workpiece against a support surface. In any event, the mere feeding of the workpiece in the direction of cutting will not, by itself, produce the smooth surfaces which may be obtained by practicing the methods of this invention.

The present invention, it will be found, is applicable to both single and double arbor saw machines. It may also be used in connection with saws mounted on either top or bottom arbors. The important distinction in using the methods of this invention as compared with the prior art methods described above is in the further use of a saw splitter that is free to move laterally in a direction substantially parallel to the axis of blade rotation and which is shifted transversely in response to lateral transverse deflections of the saw. More specifically, it has been found that the combined steps of moving a piece of wood into a circular saw in the direction of cutting while shifting a splitter transversely in response to lateral transverse deflections of the saw may be used to produce exceptionally smooth surfaces on rotary cut lumber, surfaces which may be compared favorably with surfaced lumber. The various techniques and devices for practicing this invention are more fully described below.

It is to be understood that various forms of apparatus and devices described herein have separate utility and may be used to improve the operation of rotary saws, particularly those that are mounted for axial movement upon a saw arbor and held in a predetermined cutting plane by saw guides.

It is, therefore, a principal object of this invention to provide methods and apparatus for commercially sawing wood and to produce lumber having an exceptionally smooth surface, one that may be compared favorably with a surface formed with a cylinder type planer.

Another object is to provide a method of cutting with rotary saws which permits the use of saw blades having a minimum kerf and a side clearance less than 0.010 inch per side for each tooth.

Another object of the invention is to provide improved forms of apparatus that may be used in commercial operations to produce lumber at a high production rate and with a much higher recovery than heretofore possible.

It is another object of the invention to provide a method of sawing wood to produce a smooth rotary planed surface with a circular saw and a splitter by moving a piece of wood into the circular saw in the direction of cutting and shifting the splitter transversely in response to lateral transverse deflections of the saw.

A further object of the invention is to provide a saw machine having a rotary saw blade mounted for axial movement upon a saw arbor and a pair of saw guides disposed on opposite sides of the saw blade, each saw guide including a wear member, and an improved means for yieldably supporting said wear members to rigidify the blade while maintaining the blade in a predetermined cutting plane.

Other objects of this invention will become apparent in view of the following detailed description.

In the drawings forming a part of this application and in which like parts are identified by like reference numerals throughout the same, FIG. 1 is a side elevation and partial section of a single arbor, battery edger constructed and operated in a preferred manner contemplated by this invention;

Figure 1:
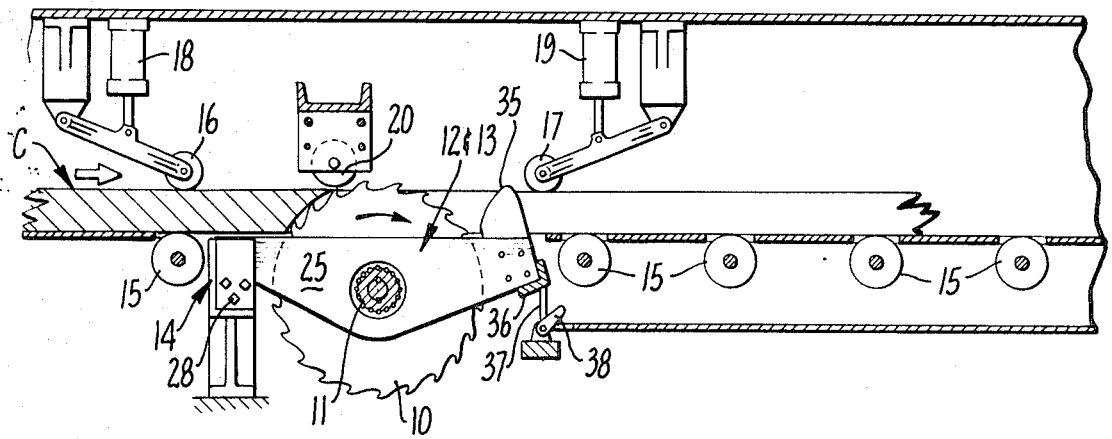

Referring to FIG. 1, there is shown a preferred method and apparatus for practicing this invention, said apparatus comprising a battery of rotary saws 10 each keyed for rotation with a splined shaft or arbor 11 that is driven clockwise, as shown. Each saw is mounted with a floating axialooseness, as described in U.S. Pat. No. 3,285,302, and is guided in a predetermined cutting plane by a pair of spaced saw guides 12 and 13 supported from a mounting block 14 disposed adjacent the front edge of saws 10. The construction of these saw guides is described hereinafter in greater detail.

It will be noted that saws 10 are not mounted upon arbor 11 with saw collars as in the conventional manner. Instead, saws 10 are formed with a center opening having a scalloped edge 10a that is defined by a plurality of equally spaced circular arcs, each arc receiving one of the circular splines that is provided on splined surface 11a of arbor 11. This saw mounting arrangement has been found particularly useful since it permits the use of saw guides in areas closely adjacent to the saw arbor while facilitating the axial movement of blades along the arbor. In addition, and by reason the self-centering action which is produced when arbor 11 is rotated, essentially all clearances between splined surface 11a and scalloped edge 10a are eliminated. This reduces blade vibrations which are normally created by a sloppiness in fit or clearances as between the shaft and opening of standard saw collars. The reduction or elimination of vibrations is an important factor in making cuts of maximum smoothness.

The work piece or cant C is fed into rotary saws 10 in the same direction as the direction of cutting. Simultaneously, cant C is held against a plurality of feed and transport rollers 15 by means of press rolls 16 and 17, respectively disposed on front and back sides of the saws. Press roll 16 is adapted to be moved and held against the cant by a cylinder 18 and press roll 17 is similarly positioned and held down by a cylinder 19. A preferred form of apparatus contemplated by this invention also includes a fixed roller 20 disposed directly in front of saws 10, the lower surface of said roller being at a level only slightly below the maximum cutting height of the saws. This roller assures that each cant passing through the battery of saws will be cut and that no piece is able to pass into and then over the top of the saws.

It is to be understood that a lubricating fluid is introduced into the work area of saw blades 10 in any conventional manner. For example, lubricating fluid may be introduced through the saw guides or, as more conventionally constructed, the machine may be equipped with a dispensing tube having a plurality of jets through which water is sprayed into the working area.

Saw guides 12 and 13 comprise a resilient support arm 25, the front end of each arm being rigidly clamped in mounting block 14, which essentially comprises a plurality of centering plates 26 and spacer blocks 27, 27' held together in a block assembly by a plurality of through bolt connectors 28. Referring to FIGS. 2 through 5, it will be seen that the support arms of each pair of saw guides 12 and 13 are clamped against opposite sides of one centering plate 26, each centering plate defining a reference plane for maintaining one of the saws in a predetermined cutting plane. Support arms 25 are held against centering plates 26 (and in spaced relation to other support arms) by spacer blocks 29, facing plates 30 and layers of hard rubber 31. One facing plate 30 is bonded to one of the hard rubber layers 31 which in turn is bonded to the side facing of a support arm 25, forming a one-piece assembly. Layers 31 function as a vibrational dampening means but also provide "give," allowing each support arm to be interdigitated with spacer blocks and centering plates by wedging them therebetween. Each facing plate 30 allows the support arm to be mounted in block 14 between other support arms without abrading the resilient material which would otherwise be exposed.

Each complementary pair of support arms 25 are interconnected in back of saws 10, a splitter 35 being clamped therebetween. In addition, the rear ends of support arms 25 normally rest upon an angle bar 36 which may be moved rearwardly to a nonsupporting position. More particularly, bar 36 is pivotally supported upon a pair of radial arms 37, each arm being secured to a shaft that may be rotated by operating a crank arm 38. Thus, a slight clockwise rotation of crank arm 38 will move angle bar 36 to a nonsupporting position in back of support arm 25. This allows each support arm to be pivoted about the saw arbor axis into the broken line position illustrated in FIG. 2, a position from which the saws and saw guides may be removed axially from arbor 11.

It is to be understood that the flexibility of each support arm 25, which may be made of aluminum, allows the saw guides to move laterally in a direction substantially parallel with the axis of arbor 11. The resiliency of each support arm, however, causes the arm as well as the guided saw blade 10 to return to its neutral position.

Each saw guide further comprises a wear plate 40 mounted to a support arm 25 and having a wear surface that is maintained in contact with the side surface of a saw blade under a resilient preload force. This force is provided by a layer of resilient material 41 sandwiched between the support arm and its supported wear plate. In a preferred construction, the wear plate may be made of micarta and the resilient layer of polyurethane foam which is maintained in compression by the spacing of the support arms and their own resiliency.

Figure 2:
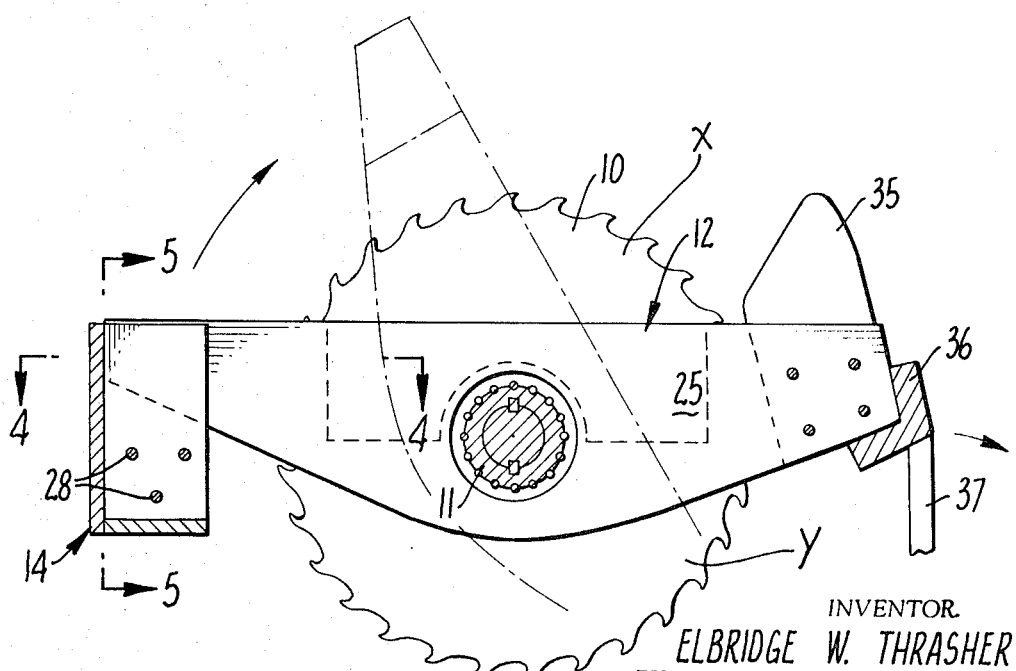
FIG. 2 is an enlarged view of a portion of the battery edger shown in FIG. 1.
Figure 3:
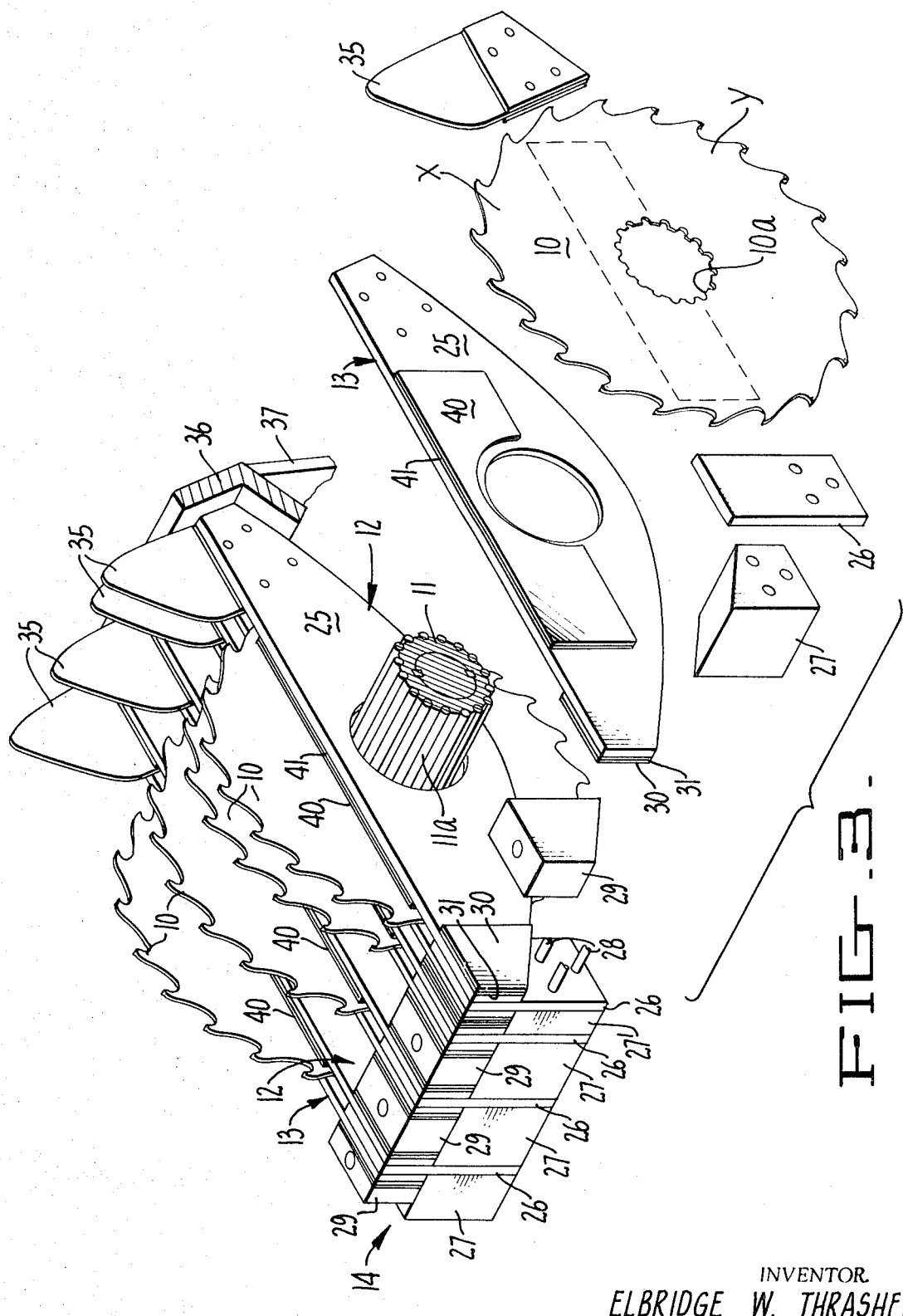
FIG. 3 is a perspective view of a portion of the battery edger showing the relationship of saw blades, saw guides and splitters.
Figure 4:
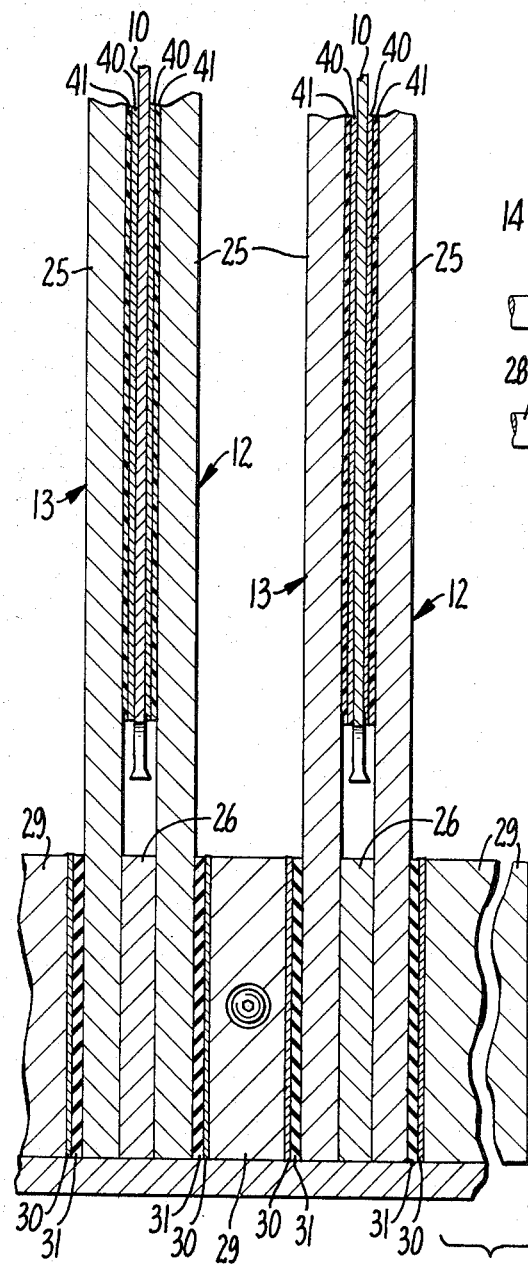
FIG. 4 is an enlarged section taken on lines 4–4 of FIG. 2.
Figure 5:
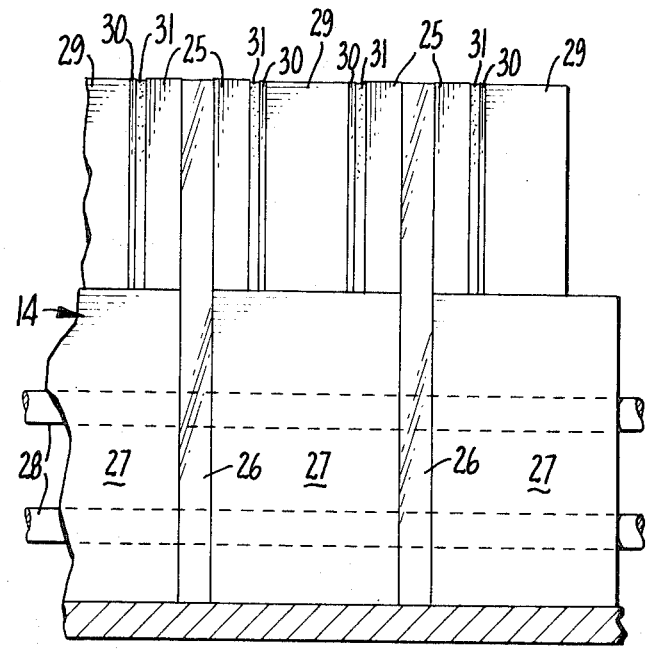
FIG. 5 is an enlarged elevation and section taken on lines 5–5 of FIG. 2.

Referring to FIGS. 2 and 3 in particular, it will be evident that wear plates 40 provide an area of continuous contact extending from points near the gullet on the leading edge of the saw blades across the blade to points adjacent the back edge thereof and that the area of contact on each side of the saw blade is generally opposite to the area of contact made on the other side. Further, the areas of continuous contact extend between the working area of each saw and the saw arbor and form two separated and unsupported blade areas of different size, these areas being indicated generally by the reference letters X and Y. The smaller of the two areas X it will be seen is the working area of the blade, the larger area being provided below wear plates 40 to allow for blade warpage when the blade is stretched during use.

In operation, the preload force of each saw guide 12 counteracts the preload force of the saw guide 13 forming its pair. These forces rigidify the saw blade in the contacted areas while also maintaining each saw blade in a predetermined cutting plane. The flexibility of layer 41 and the resiliency of support arms 25, however, provide sufficient give to tolerate minor deflections in the saw blade as might be caused by slivers of wood or knots. Any lateral distortions or deflections of the saw will increase the forces which tend to return the saw into its intended cutting plane. It is also important to note that since each pair of saw guides 12 and 13 are connected together in back of the saws they move as a unit, the resiliency of both support arms acting to return the saw blade confined therebetween to its neutral position while maintaining pressure on both sides of the saw.

The method and apparatus described above has been found particularly effective for guiding relatively thin saws having a saw kerf of only 0.100 inch. The invention, moreover, allows and fully contemplates the use of saw blades having saw kerfs substantially less than 0.100 inch when cutting wood material of a nominal four inch thickness and greater on a high production basis with extreme accuracy. Even so, it is contemplated that saw kerfs and blades of greater thickness may be used to produce a rotary smoothness in accordance with the methods herein described.

Figure 6:
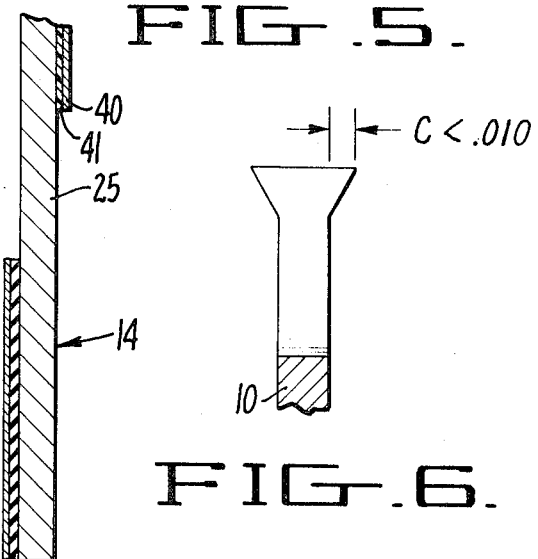
FIG. 6 is an enlarged detail of a single tooth of one of the rotary saw blades.

It has been found that the method of sawing herein described may be effectively practiced in cutting wood having a nominal thickness four inches and greater even though the side clearance of each saw tooth is less than 0.010 inch per side, as indicated in FIG. 6. This is to be compared with a side clearance of 0.015 as used in the best known procedures of the prior art, which also operate with thin saw blades. Although the difference in side clearance (amounting to 0.010 inch across the full width of each tooth) may not appear substantial, even this difference may be a major factor in the recovery level for commercial mill operations. But the importance of the invention is further highlighted since it is possible to use side clearances well below 0.010 inch per side. In actual practice it has been found that thin saws may be operated with a side clearance less than 0.005 inch per side.

The use of saw blades having comparatively small kerfs and side clearances are particularly favored since it has been found that they produce a smoother cut. It is believed that this is at least partly attributable to the smaller size chip that is cut from the workpiece. Larger kerfs produce larger chips and this, it would seem, increases the vibration on the teeth and/or produces a more abrupt cut in the workpiece. In any event, the methods and apparatus described herein may be more effectively utilized to produce smoother cuts by employing saw blades with a small kerf and reduced side clearances.

It is contemplated that saw blades used with this invention should be precision side-ground to maintain the side clearances suggested above. In this regard, the saw blades either may be formed with carbide teeth or the teeth may be swaged in the normal manner and then ground to the specified clearance. In the latter event, it is desirable to harden the top of each tooth to maintain sharpness and increase wear. One type of apparatus found to be particularly useful for hardening the saw teeth is that manufactured by Rocklin Manufacturing Company wherein tungsten carbide is deposited on each tooth in a process known as "spark hardening."

It is further contemplated that in a preferred machine embodiment for practicing this invention each piece of lumber cut by saws 10 will be moved rearwardly upon rollers 15 until discharged onto a transverse conveyor, and that while being moved the lumber will be confined within a continuous housing. It is only after the lumber pieces come to rest on the transverse conveyor, which may be disposed at an elevation below the surface of rollers 15, that the lumber will be brought into the open. The preferred embodiment might further include a bumper or stop positioned in back of the transverse conveyor in line with rollers 15 and spaced from the last roller 15 a distance that is at least as great as the length of the longest workpiece which may be cut. This housing arrangement provides maximum safety conditions and insures that no piece of lumber may be inadvertently hurled from the roller conveyor by the cutting action of the saws into an area occupied by mill hands or operators.

Although a preferred embodiment of this invention has been illustrated and described, various modifications and changes may be resorted to without departing from the spirit of the invention or the scope of the attached claims, and each of such modifications and changes is contemplated. For example, this invention has been described in connection with a single arbor machine but each of the various features may also be used in connection with a double arbor saw machine and/or a shiftable edger.

I claim:

1. In a saw machine having a rotary saw blade mounted for axial movement upon a saw arbor and a parallel saw guide disposed on opposite sides of the saw blade, each saw guide including a wear member, and further comprising: means for yieldably supporting at least one wear member for movement in a direction substantially parallel to the axis of blade rotation, said wear member being maintained in contact against the side surface of the saw blade with a force that urges a saw blade against the wear member forming its pair to rigidify contacted portions of said blade and maintain said blade in a predetermined cutting plane, said support means comprising a support arm mounted adjacent the front edge of said saw blade and having a layer of resilient material disposed between said support arm and a supported wear member, said resilient layer being compressed to place a preload force upon said wear member urging said member against said saw blade.

2. The saw machine of claim 1, and further comprising means interconnecting said pair of saw guides adjacent both front and back edges of said saw blade.

3. The saw machine of claim 1, said support arm being mounted in a laminar block assembly comprised of spacer blocks and centering plates, said centering plates being of predetermined width to position a pair of saw guides on opposite sides and in guiding relation to the saw blade.

4. In a saw machine having a rotary saw blade mounted for axial movement upon a saw arbor and a pair of saw guides disposed on opposite sides of the saw blade, each saw guide including a wear member, and further comprising: means for yieldably supporting at least one wear member for movement in a direction substantially parallel to the axis of blade rotation, said wear member being maintained in contact against the side surface of the saw blade with a force that urges a saw blade against the wear member forming its pair to rigidify contacted portions of said blade and maintain said blade in a predetermined cutting plane, said support means comprising at least one support arm mounted adjacent the front edge of said saw blade and having a facing plate mounted thereto with a resilient layer of material disposed therebetween.

5 In a saw machine having a rotary saw blade mounted for axial movement upon a saw arbor and a pair of saw guides disposed on opposite sides of the saw blade, each saw guide including a wear member, and further comprising: means for yieldably supporting at least one wear member for movement in a direction substantially parallel to the axis of blade rotation, said wear member being maintained in contact against the side surface of the saw blade with a force that urges a saw blade against the wear member forming its pair to rigidify contacted portions of said blade and maintain said blade in a predetermined cutting plane, and further comprising means for supporting said pair of saw guides adjacent the back edge of said saw blade, said support means being movable into a position nonsupporting relative to said saw guides, whereby said saw guides may be rotated relative to the axis of the saw arbor for axial removal.

6. In a saw machine having a rotary saw blade mounted for axial movement upon a saw arbor and a pair of saw guides disposed on opposite sides of said blade, each saw guide including a wear member, and further comprising: means for yieldably supporting at least one wear member for movement in a direction substantially parallel to the axis of blade rotation, said wear member being maintained in contact against the side surface of the saw blade with a force that urges the saw blade against the wear member forming its pair to rigidify contacted portions of said blade and maintain said blade in a predetermined cutting plane; and a splitter disposed adjacent the back edge of the saw blade and mounted to said support means, said splitter being free to move laterally in a direction substantially parallel to the axis of blade rotation in response to transverse deflections of said saw blade.

7. The saw machine of claim 6, and further comprising means for supporting said saw guides and splitter adjacent the back edge of the saw blade.

8. The saw machine of claim 7, said support means being movable into a nonsupporting position relative to said saw guides and splitter, whereby said saw guides and splitter may be rotated relative to the axis of the saw arbor for axial removal.

9. A saw machine having a rotary saw blade mounted for axial movement upon a saw arbor and a pair of saw guides disposed on opposite sides of said saw blade, each saw guide including a wear member supported in close proximate relationship to the side surface of a saw blade and providing an area of contact including points near the gullet on the leading edge of said saw blade and points adjacent the back edge of said blade, the area of contacts on one side of said blade being generally opposite to contacts on the other side, said saw having two unsupported areas above and below said saw guides, said areas being of different size, the smaller of the two areas being used as the working area of said blade; a splitter disposed adjacent the back edge of said saw blade, said splitter being free to move laterally in a direction substantially parallel to the axis of blade rotation in response to transverse deflections of said saw blade; and means for moving a workpiece against said saw blade in the direction of rotational cutting.

10. The saw machine of claim 9, and further comprising means for yieldably supporting at least one wear member for movement in a direction substantially parallel to the axis of blade rotation, said wear member being maintained in contact against the side surface of the saw blade with a force that urges the saw blade against the wear member forming its pair to rigidify contacted portions of said blade and maintain said blade in a predetermined cutting plane, each wear member providing an area of substantially continuous contact extending between points near the gullet on the leading edge of said blade across the blade to points adjacent the back edge of said blade.

11. The saw machine of claim 9, said saw blade having saw teeth that are precision side-ground to provide a side clearance less than 0.010 inch per side.

12. The saw machine of claim 11, each saw tooth being hardened on top prior to side grinding.

13. The saw machine of claim 9, said splitter having a width substantially equal to or greater than the width of the kerf of said saw blade.